G. W. KELLOGG.
AIR PUMP FOR AUTOMOBILES.
APPLICATION FILED APR. 2, 1917.
1,205,991.
Patented Mar. 4, 1919.
2 SHEETS—SHEET 2.
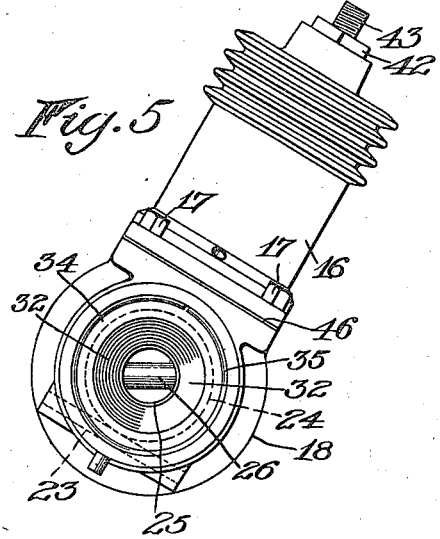
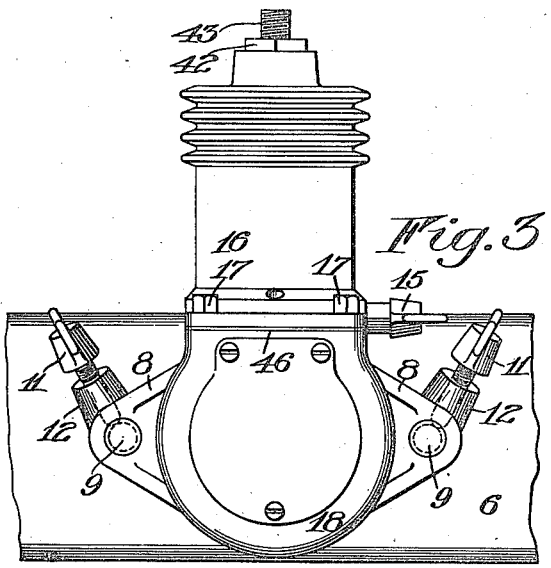
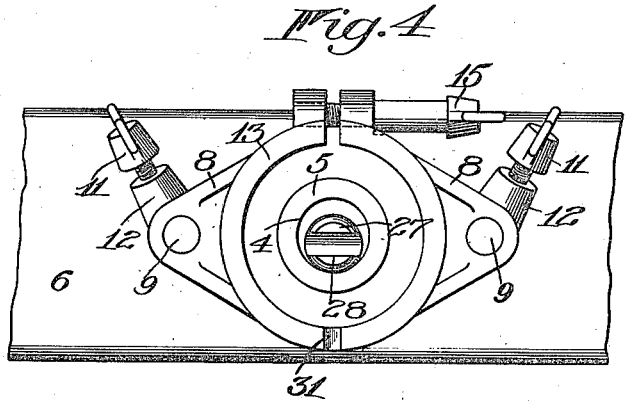
WITNESSES:
INVENTOR
George W. Kellogg
BY
his ATTORNEY

UNITED STATES PATENT OFFICE.

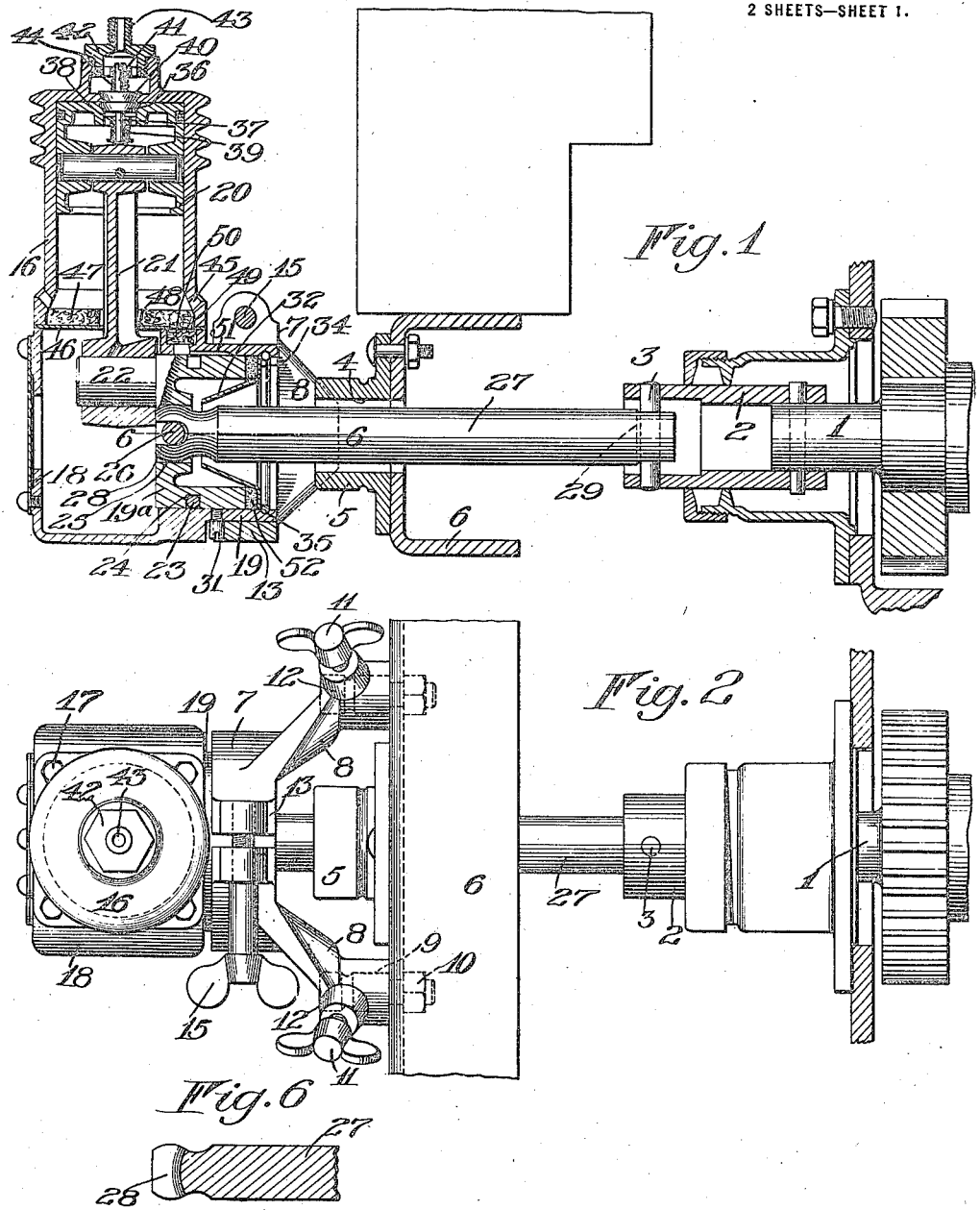

GEORGE W. KELLOGG, OF ROCHESTER, NEW YORK, ASSIGNOR TO KELLOGG MANUFACTURING CO., OF ROCHESTER, NEW YORK, A CORPORATION OF NEW YORK.

AIR-PUMP FOR AUTOMOBILES.

1,295,991.  Specification of Letters Patent.  Patented Mar. 4, 1919.

Application filed April 2, 1917. Serial No. 159,197.

*To all whom it may concern:*

Be it known that I, GEORGE W. KELLOGG, of Rochester, county of Monroe, and State of New York, have invented certain new and useful Improvements in Air-Pumps for Automobiles; and I do hereby declare the following to be a full, clear, and exact description of the same, reference being had to the accompanying drawings, forming a part of this specification, and to the reference-numerals marked thereon.

My present invention relates to air compressors or pumps, such as are used for inflating automobile tires, and it has for its especial object to provide a pump that can be readily attached to the frame of a motor vehicle in such a position as to be driven directly by the crank shaft of the engine without the interposition of gearing, or other driving connections. A further object of my invention is to construct a pump and the connecting driving element, which coöperates with the engine crank shaft, in such a manner that they may be readily disconnected to permit the parts to be packed compactly, thus allowing both the pump and its driving connection to be stored in the usual tool box. To these and other ends the invention consists in certain improvements and combinations of parts, all as will be hereinafter more fully described, the novel features being pointed out in the claims at the end of the specification.

In the drawings:

Figure 1 is a vertical sectional view showing a pump constructed in accordance with my invention applied in its operative position on an automobile, and showing its connecting member by which it is driven from the engine crank shaft;

Fig. 2 is a plan view thereof;

Fig. 3 is a front view of the pump showing the attaching devices by which it is removably held in position;

Fig. 4 is a similar detail view of the pump attaching bracket;

Fig. 5 is a rear view of the pump shown adjusted in an angular position, and

Fig. 6 is a sectional view on the line 6—6 of Fig. 1.

Similar reference characters throughout the several views designate the same parts.

A pump constructed in accordance with my invention is intended to be used on automobiles which are provided with electric or other self starting devices for the engine, thereby obviating the use of the starting crank and permitting the substitution in place thereof of a driving connection by means of which the motion of the engine crank shaft is communicated directly to the pump.

In carrying out my invention I have provided an air pump which is adapted to be detachably mounted on the front cross-bar, or transversely extending portion of the frame of an automobile, in alinement with the forward end of the crank shaft of the motor, or engine, by means of a simple and compact form of bracket whereby the pump is rigidly held, and may be rotated, or tilted, into an inclined position to facilitate the engagement of the driving bar or element with a coöperating portion on the crank member of the pump. In the illustration showing the present embodiment of my invention I have shown a pump in its operative position in front of the motor, or engine shaft, indicated by 1, the forward end of which comprises a short sleeve 2 having the transversely extending pin 3 with which the starting crank is adapted to coöperate when inserted through an aperture 4 in a bearing 5 on the front cross bar 6 of the chassis.

The pump is preferably detachably mounted on the vehicle frame directly in front of the bearing 5, and at this point I provide a bracket 7, which is also detachable from the pump and has a pair of oppositely extending arms which are recessed at their ends, to slip over projecting bolts 9 secured to the channel bar by nuts 10. Thumb screws 11 threaded in upwardly extending bosses 12, on the arms 8, are adapted to engage within annular recesses in the bolts 9 to prevent the accidental removal of the bracket. The center of the bracket comprises the split sleeve 13, which is concentric with the bearing 5, and is provided with the clamping screw 15.

The pump embodies the cylinder 16, secured by the bolts 17 to the crank case 18, having the collar 19 which fits the center opening in the bracket and serves to support the pump in any desired position thereon. The piston 20, operating within the cylinder, is connected by the pitman 21 to the crank-pin 22, on a disk, or barrel, 19ª, having a bearing extending into the collar 19. The crank disk is prevented from displacement longitudinally by a pin 23 which extends across one side of the crank case and lies in a groove 24 in the disk. The latter constitutes the crank shaft of the pump and is hollow, being provided with a large central recess leading in from the outer end of the shaft and forming thereon, at its inner end, the head, or face plate, carrying the crank pin 22 and the coupling member with which the clutch member on the outer end of the extension shaft 27 coöperates. The head of the shaft is also provided with a central aperture 25 across which extends a pin 26 adapted to receive the end of the driving connecting member 27. The member, or shaft, 27 is provided at its opposite ends with slots 28 and 29 adapting it to engage the pins 3 and 26. The front end of the rod 27 is of spherical contour and the recess 28 is formed on a curve as shown in Fig. 6, so that a slight angular movement of the rod in any direction is permitted without interfering with the driving of the crank disk.

In order to facilitate engagement of the couplings on the shaft 27 and the pump shaft a guide member extends into the open end of the latter. This part, in the present invention, comprises an inwardly tapering frusto-conical sleeve 32, provided with a marginal flange 34, which fits within the bearing 19 beyond the end of the pump shaft where it is held in place by a spring wire retainer 35.

The air inlet valve 36 in the present instance is located in the center of the piston and is carried on a valve stem 37 movable in a guide 38 and actuated to close the valve by a spring 39, while the exhaust valve 40 in the cylinder head is carried on a stem 41 guided in a removable plug 42 provided with the usual hose connection 43, the exhaust valve being held against its seat by a spring 44. Upon downward motion of the piston, the valve 36 opens quickly on account of its inertia, permitting air entering through the openings 45 in the base of the cylinder to enter the space above the piston. Upon upward movement of the piston the inertia of the valve assists the spring 39 in causing it to immediately close, causing the air compressed above the piston to escape through the exhaust valve 40.

In order to provide adequate lubrication for the piston I provide a felt pad 47 which may be saturated with oil and so located with reference to the lower edge of the piston that the latter pressing against the pad, at the limit of its downward motion, takes up a little of the oil and transfers it to the cylinder walls on the upward stroke. This pad is carried by a plate 46 clamped between the cylinder and crank case when the pump is assembled. The plate is provided with an aperture 48, for the passage of the pitman, and the aperture 49, through which the pad 47 communicates with a smaller piece of felt 50, inserted in a pocket in the crank case above the crank disk for the purpose of lubricating the latter. A channel 51 leads from the felt 50 longitudinally of the bearing 19, and distributes the oil over the surface of the crank disk, the escape of oil at the end of the bearing being prevented by a felt ring 52 inserted between the end of the crank disk and the flange 34 on the sleeve 32.

In connecting the pump the shaft 27 is inserted through the bearing 4, and its forked inner end engaged with the pin 3 on the engine shaft. The bracket 7 may then be positioned on the bolts 9 and secured by means of the thumb screws 11. The circular extension, or collar, 19 on the pump is then inserted within the recess of the bracket, the guide 32 serving to position the outer end of the shaft 36 approximately in central alinement with the coupling member on the crank disk. If the pin 26 in the latter is at an angle to the slot 28 in the outer end of the rod 27, it will strike the end of the rod, and in order to cause the pin to engage the slot, the pump, as a whole, is rotated angularly in the bracket, as shown in Fig. 5, to bring said parts into registration. When the pin enters the recess the pump is moved inwardly and may be rotated to a vertical position, the crank disk and piston moving with the pump casing during this operation. When the pump is positioned vertically continued inward movement thereof will cause the engagement of a projection, such as a screw 31, with a notch in the edge of the bracket. When the pump is properly adjusted the clamping screw 15 is turned to tighten the bracket ring to securely hold the pump against accidental removal, or displacement.

In the device disclosed many advantages exist which add to the simplicity of the pump and its effectiveness in operation. The hollow crank shaft is an important element. In addition to making this with a large bearing surface I have brought into the art the idea of locating the point of the driving connection, afforded by the pin 26, as near to the operating plane of the pitman 21, as possible, thus providing the dual advantage of reducing to the minimum the torsion in this shaft, and the tendency to wear its bearing unevenly. In practice I find that when the pump is located on the automobile chassis in front of the engine shaft allowances must be provided both in the construction of the pump and its connecting driving element, because of the practical difficulty in obtaining an accurate alinement of the crank disk with the engine, or motor, shaft, and maintaining this alinement at all times. The universal movement provided in the shaft 27 by its slot and pin connection is not sufficient to relieve a pump of undue wear and strain in a construction in which the shaft 27 is connected to the pump shaft at a point removed from the crank pin since a tendency to wabble is imparted to the outer end of the pump shaft. In the construction shown it will be seen that the enlargement of the pump shaft bearing permits it to be made hollow, thus allowing the pin 26 to be located adjacent its inner end and provides the rim portion of the shaft, or disk, 19ª, which, lying in the rear of the point at which the driving force is applied contributes to its steady and smooth operation. Further advantages are found in the means employed for mounting the pump on the removable bracket, which is also detachable from the chassis, as these parts being made separately can be easily assembled in operative position, and when disconnected stored in a small space.

I claim as my invention:

1. In a pump, the combination of a crank case, a cylinder secured thereto, a piston in said cylinder, a barrel revolubly mounted in said crank case, a crank pin on one end of said barrel, means connecting said crank pin and said piston, an extension shaft adapted to be connected to the crank shaft of a motor, and means in the end of said barrel adjacent said crank pin to which said extension shaft is connected.

2. In a pump, the combination of a crank case having a laterally projecting collar, a cylinder secured thereto, a piston in said cylinder, a head having a laterally projecting bearing journaled in said crank case, a crank pin on said head, means connecting said crank pin and said piston, an extension shaft having one end adapted to be loosely connected to the crank shaft of a motor, and means on said head to which the other end of said extension shaft is loosely connected.

3. In an air pump attachment for automobiles, the combination of a pair of projecting bolts adapted to be secured to the machine in spaced relation to each other, a bracket having a pair of apertured spaced arms adapted to fit over said bolts, means for securing the arms to said bolts, a sleeve on said bracket, a pump having a collar adapted to be revolubly fitted in said sleeve, interlocking means between said collar and sleeve for preventing rotating of the collar, and means for securing the collar in said sleeve.

4. In an air pump attachment for automobiles, the combination of a pair of projecting bolts adapted to be secured to the machine in spaced relation to each other, a bracket having a pair of apertured spaced arms adapted to fit over said bolts, means for securing the arms to said bolts, a split sleeve on said bracket, a pump having a collar adapted to be revolubly fitted in said sleeve, and means for clamping the collar in said sleeve.

5. In a pump, the combination of a cylinder, a piston therein, a crank case, a barrel open at its outer end journaled in said crank case, a head on the inner end of said barrel, a coupling member in said head, a coöperating member, and means in the open end of said barrel for guiding said coöperating member into approximate alinement with said coupling member.

6. In a pump, the combination with a cylinder having a piston and a crank case having a bearing therein, of a hollow drive shaft having a head at its inner end provided with a clutch member and a shell supported on the crank case and tapering inwardly into the shaft recess and adapted to guide a coöperating member into approximate alinement with the clutch member on the shaft.

7. In a pump, the combination of a crank case, a cylinder secured thereto, a piston movable in said cylinder, a barrel revolubly mounted in said crank case operatively connected with said piston, and an extension shaft loosely connecting said barrel with the crank shaft of an engine.

GEORGE W. KELLOGG.